(12) United States Patent
Tran et al.

(10) Patent No.: US 9,453,538 B2
(45) Date of Patent: Sep. 27, 2016

(54) ISOLATOR FOR ENGINE WITH PROGRESSIVE LOCK-UP FOR ISOLATION SPRING

(71) Applicant: Litens Automotive Partnership, Woodbridge (CA)

(72) Inventors: Hao Q. Tran, North York (CA); Andrew M. Boyes, Aurora (CA); Boris Replete, Toronto (CA); Vladimir I. Starodoubov, North York (CA); John Antchak, Aurora (CA); Pierre A. Mevissen, King City (CA)

(73) Assignee: Litens Automotive Partnership, Woodbridge, ON (CA)

( * ) Notice: Subject to any disclaimer, the term of this patent is extended or adjusted under 35 U.S.C. 154(b) by 16 days.

(21) Appl. No.: 14/470,937

(22) Filed: Aug. 27, 2014

(65) Prior Publication Data
US 2015/0060232 A1    Mar. 5, 2015

Related U.S. Application Data

(60) Provisional application No. 61/870,620, filed on Aug. 27, 2013, provisional application No. 61/870,626, filed on Aug. 27, 2013.

(51) Int. Cl.
| F16H 55/36 | (2006.01) |
| F16D 7/02 | (2006.01) |
| F16F 15/123 | (2006.01) |
| F16D 41/20 | (2006.01) |

(52) U.S. Cl.
CPC ............. *F16D 7/022* (2013.01); *F16D 41/206* (2013.01); *F16F 15/123* (2013.01); *Y02T 10/76* (2013.01)

(58) Field of Classification Search
CPC ..... F16D 7/022; F16D 41/206; F16F 15/123
USPC ................ 464/40, 57–60; 192/41 S; 474/94; 267/155, 179
See application file for complete search history.

(56) References Cited

U.S. PATENT DOCUMENTS

| 3,666,021 A * | 5/1972 | Whitehouse | ............ B25B 23/14 |
| | | | 464/60 X |
| 4,690,256 A * | 9/1987 | Bopp | .................... F16F 15/161 |
| | | | 464/57 X |
| 5,964,674 A * | 10/1999 | Serkh et al. | .......... F16H 7/1218 |
| 7,070,033 B2 | 7/2006 | Jansen et al. | |

(Continued)

FOREIGN PATENT DOCUMENTS

| DE | 21202 | * 4/1961 |
| WO | 2011160202 A1 | 12/2011 |

*Primary Examiner* — Gregory Binda
(74) *Attorney, Agent, or Firm* — Millman IP Inc.

(57) ABSTRACT

In an non-limiting embodiment, an isolator is provided for isolating a device driven by an engine via an endless drive member. The isolator includes a shaft adapter that is connectable with a shaft of the device, a rotary drive member that is engageable with the endless drive member, a torsion spring that is positioned to transfer torque between the shaft adapter and the rotary drive member, and a torque limiting surface. The torsion spring has a first helical end, a second helical end and a plurality of coils between the first and second helical ends. The torque limiting surface has a selected non-zero spacing from the coils. The spacing between the torque limiting surface and each coil is selected such that, during operation, the torsion spring has a spring rate that is below a first spring rate during relative movement between the shaft adapter and the rotary drive member within a selected angular range from a neutral position, and has a spring rate that increases progressively above the first spring rate during relative movement between the shaft adapter and the rotary drive member beyond the selected angular range from the neutral position.

12 Claims, 9 Drawing Sheets

(56) References Cited

U.S. PATENT DOCUMENTS 7,878,315 B2 * 2/2011 Saito et al. .......... F16D 41/206
192/41 S 7,972,231 B2 7/2011 Kawamoto et al.
2012/0015768 A1 * 1/2012 Serkh .................. F16H 55/36
474/94

* cited by examiner

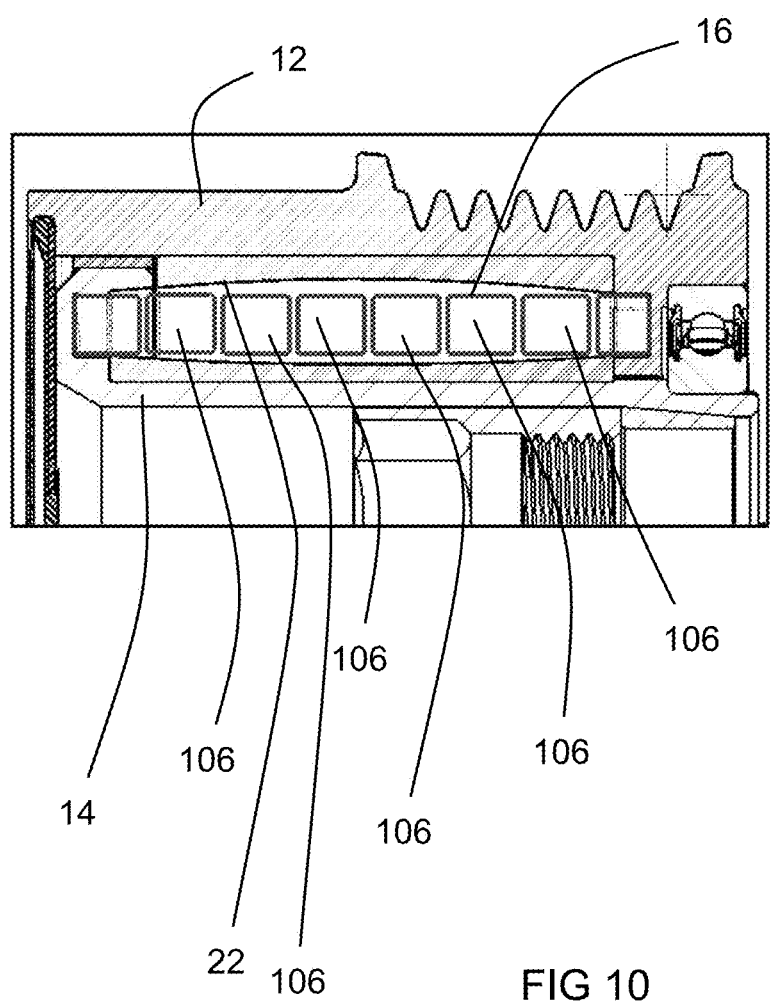

ISOLATOR FOR ENGINE WITH PROGRESSIVE LOCK-UP FOR ISOLATION SPRING

CROSS-REFERENCE TO RELATED APPLICATIONS

This application claims priority to U.S. Provisional Patent Application No. 61/870,620 filed Aug. 27, 2013, and U.S. Provisional Patent Application No. 62/870,626 filed Aug. 27, 2013, the contents of both of which are incorporated herein in their entirety.

FIELD

This disclosure relates to isolators and in particular to isolators that are used on an engine crankshaft or on a motor-generator unit (MGU) shaft in vehicles in which the engine can be started or boosted by the MGU through a belt (e.g. an engine equipped with a belt-alternator start (BAS) drive system).

BACKGROUND

Isolators are known devices that are installed on engine crankshafts and on accessory drive shafts for reducing the transmission of torsional vibrations from the crankshaft to a belt driven by the crankshaft. During a key start event (i.e. an event where the engine is being started by its starter motor), the engine is driven up to a speed of a few hundred RPM by the starter motor, fuel is introduced into the cylinders and is ignited. The engine then ramps up its speed from the initial speed where ignition first took place to an idle speed. In some instances, the engine passes through a speed where resonance can be significant.

It would be beneficial to provide an isolator that is configured to isolate one or more driven accessories from torsional vibrations that take place during such resonance or from other situations where there is a high torque transfer.

Additionally, while a traditional isolator is useful in many vehicular applications, some isolators do not perform ideally in applications wherein the belt is sometimes used to transmit torque to the crankshaft, for example as part of a Belt-Assisted Start (BAS) drive system wherein an electric motor is used to drive the belt in order to drive the crankshaft for the purpose of starting the engine.

It would be advantageous to provide an isolator that is configured for use in vehicles with BAS drive systems or the like.

SUMMARY

In an aspect, an isolator is provided for isolating a device driven by an engine via an endless drive member. The isolator includes a shaft adapter that is connectable with a shaft of the device, a rotary drive member that is engageable with the endless drive member, a torsion spring that is positioned to transfer torque between the shaft adapter and the rotary drive member, and a torque limiting surface. The torsion spring has a first helical end, a second helical end and a plurality of coils between the first and second helical ends. The torque limiting surface has a selected non-zero spacing from the coils. The spacing between the torque limiting surface and each coil is selected such that, during operation, the torsion spring has a spring rate that is below a first spring rate during relative movement between the shaft adapter and the rotary drive member within a selected angular range from a neutral position, and has a spring rate that increases progressively above the first spring rate during relative movement between the shaft adapter and the rotary drive member beyond the selected angular range from the neutral position.

In another aspect, an isolator is provided for isolating a device driven by an engine via an endless drive member. The isolator includes a shaft adapter that is connectable with a shaft of the device, a rotary drive member that is engageable with the endless drive member, and a torsion spring that is positioned to transfer torque between the shaft adapter and the rotary drive member. The torsion spring has a first helical end, a second helical end and a plurality of coils between the first and second helical ends. The torsion spring has a radially outer surface and wherein each of the first and second ends of the torsion spring has a first flat and a second flat that are substantially perpendicular to one another and which are on the radially outer surface. Each of the rotary drive member and the shaft adapter has a groove containing a first flat and a second flat which are sized to mate with the first and second flats at an associated one of the first and second helical ends of the torsion spring.

BRIEF DESCRIPTION OF THE DRAWINGS

The foregoing and other aspects will now be described by way of example only with reference to the attached drawings, in which:

FIG. 10 is a sectional side view of another alternative embodiment of an isolator.

DETAILED DESCRIPTION OF EXAMPLE EMBODIMENTS

Figure 1:
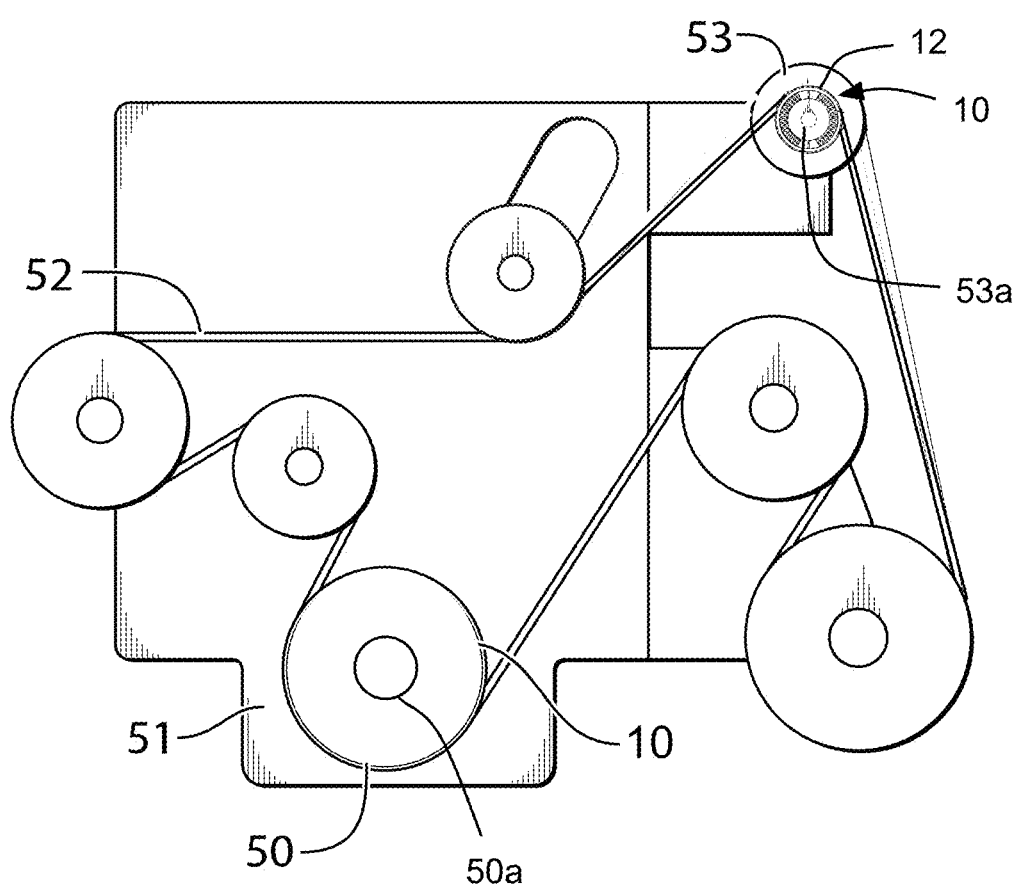
FIG. 1 is a side view of an engine in a vehicle containing an isolator on a shaft of an MGU (motor-generator unit), in accordance with an embodiment of the present invention.

Reference is made to FIG. 1, which shows an isolator 10 for transferring power between an endless drive member 52, such as an accessory drive belt, that is driven by a crankshaft pulley 50 mounted on a crankshaft 50a of an engine 51, and a shaft 53a of an MGU (motor-generator unit) 53, in accordance with an embodiment of the present invention. The isolator 10 isolates the MGU 53 from torsional vibrations in the endless drive member 52 that commonly occur in internal combustion engines. The endless drive member 52 may be referred to as a belt for convenience, however, any suitable endless drive member may be used.

The isolator 10 is useful in any engine, but is particularly useful in an engine that incorporates a BAS (belt-alternator start) system, in which the engine 51 is initially started normally (e.g. using a starter motor) but is shut down for brief periods (e.g. while the vehicle is at a stoplight) and then restarted by driving the crankshaft 50a via the belt 52. The belt 52 would be driven by the MGU 53. Alternatively, the MGU 53 may be replaced by an alternator and a separate motor may be used to drive the belt 52 during BAS events. BAS technology is becoming increasingly common in an effort to increase fuel economy of vehicles and reduce emissions.

Figure 2:
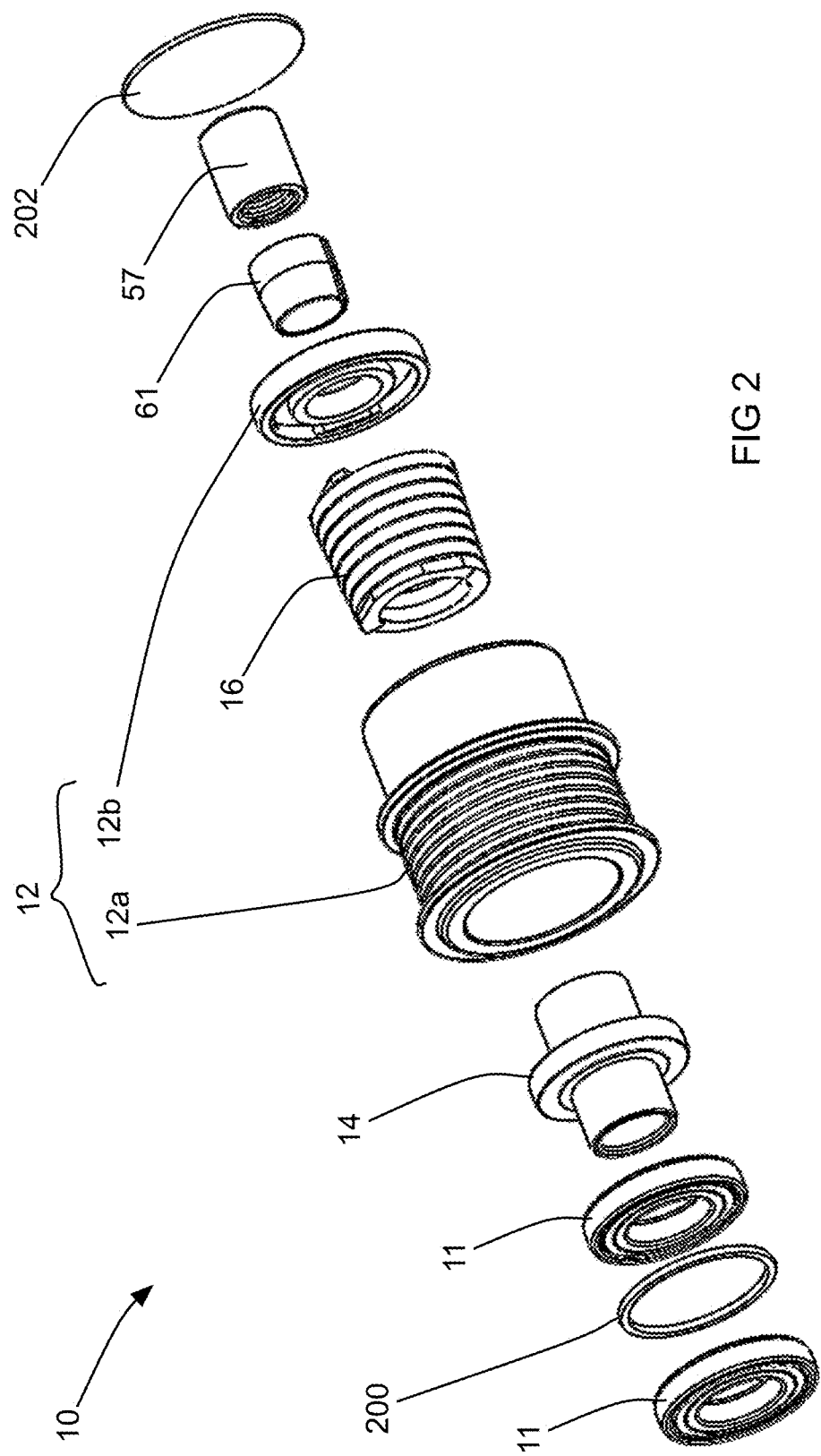
FIGS. 2 and 3 are exploded perspective views of the isolator shown in FIG. 1.

As seen in FIG. 2, the isolator 10 includes a rotary drive member 12 (which may for convenience be referred to as a pulley 12, but which may be any other suitable type of rotary drive member), a shaft adapter 14, a torsion spring 16, and, in the embodiment shown, and a torque limiting member (which in this case is the pulley 12) having a torque limiting surface 22.

Figure 4:
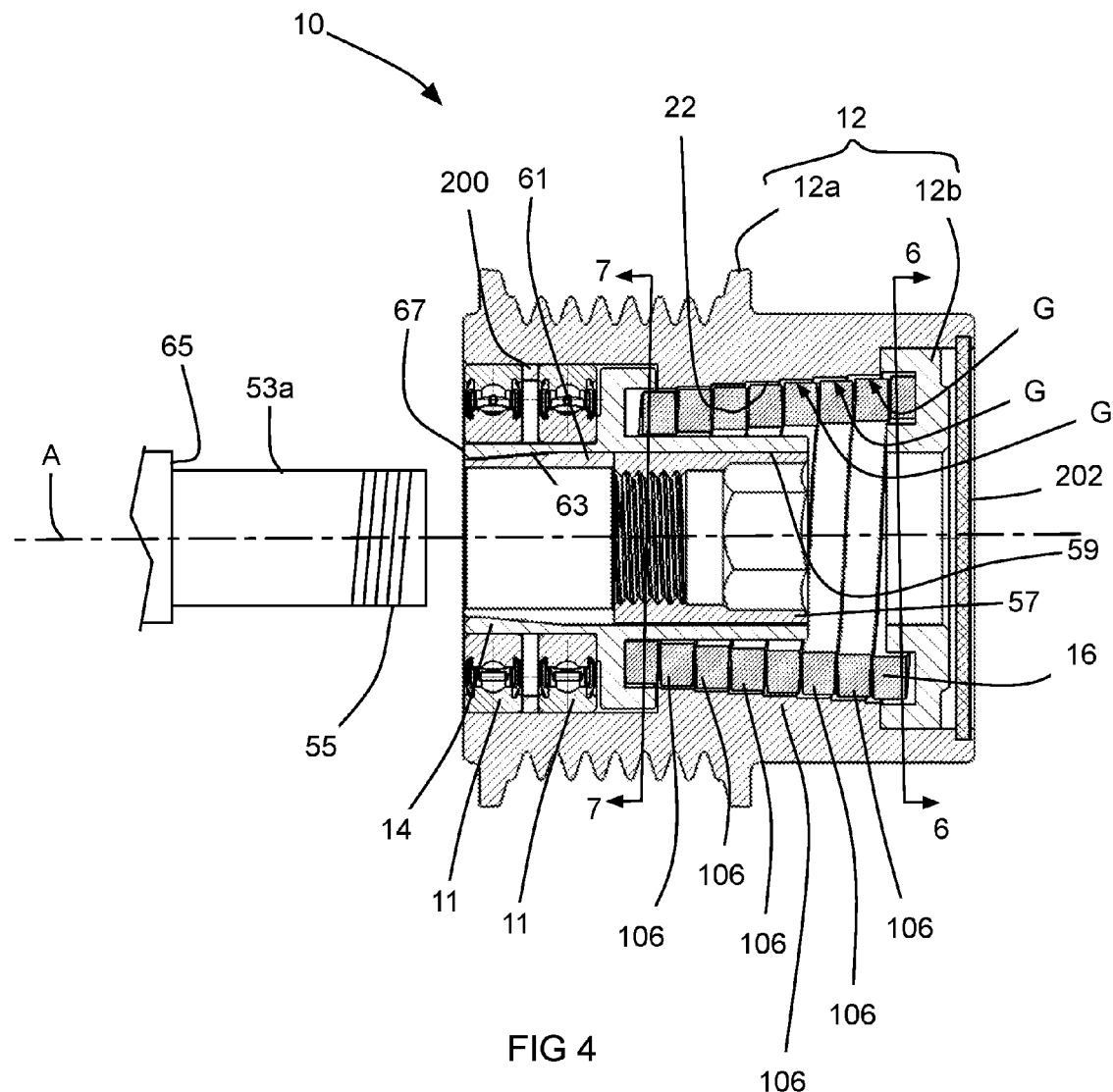
FIG. 4 is a sectional side view of the isolator shown in FIG. 1.

Referring to FIG. 4, the shaft adapter 14 is fixedly mountable in any suitable way to the MGU shaft 53a for rotation about an axis A (FIG. 4). For example, the MGU shaft 53a may include a shaft end 55 that is threaded and that mounts to a nut 57 inside a bore 59 of the shaft adapter 54. A conical split bushing 61 is urged against an inner-conical surface 63 of the shaft adapter 14. A shoulder 65 on the shaft 53a abuts an end 67 of the shaft adapter 14. Threading the nut 57 on the shaft end 55 drives the split bushing 61 on the inner-conical surface 63 to urge gripping of the split bushing 61 on the shaft 53a. Alternatively any other mounting structure may be used.

The pulley 12 is engageable with the belt 52 (FIG. 1) and is rotatably mounted to the shaft adapter 14 e.g. by means of a pair of bearing members 11 (which may be ball bearings, for example) that directly support the pulley 12 on the shaft adapter 14, so that the pulley 12 is rotatable relative to the shaft adapter 14.

In the embodiment shown, the pulley 12 includes a main pulley portion 12a and a base ring 12b that is rotationally fixed with the main pulley portion 12a.

The torsion spring 16 transfers torque between the pulley 12 and the shaft adapter 14, and elastically deforms to isolate the endless drive member 52 and the MGU shaft 53a from vibrations or other sudden changes in torque in one another.

Figure 6:
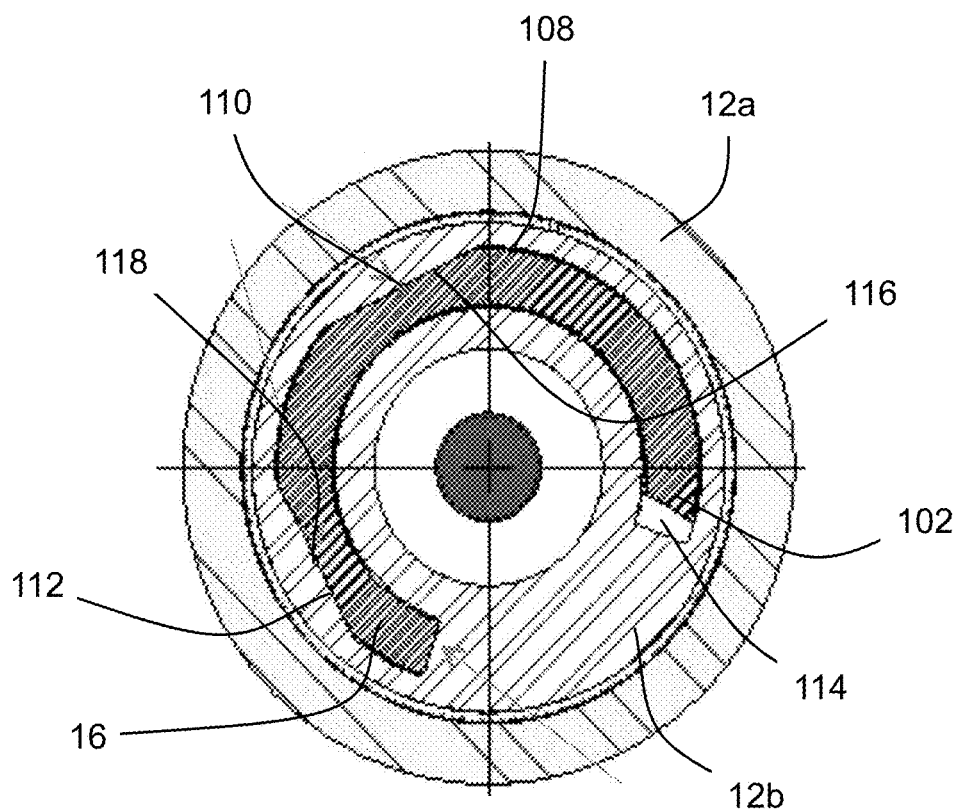
FIGS. 6 and 7 are sectional views taken at section lines 6-6 and 7-7 in FIG. 4.
Figure 7:
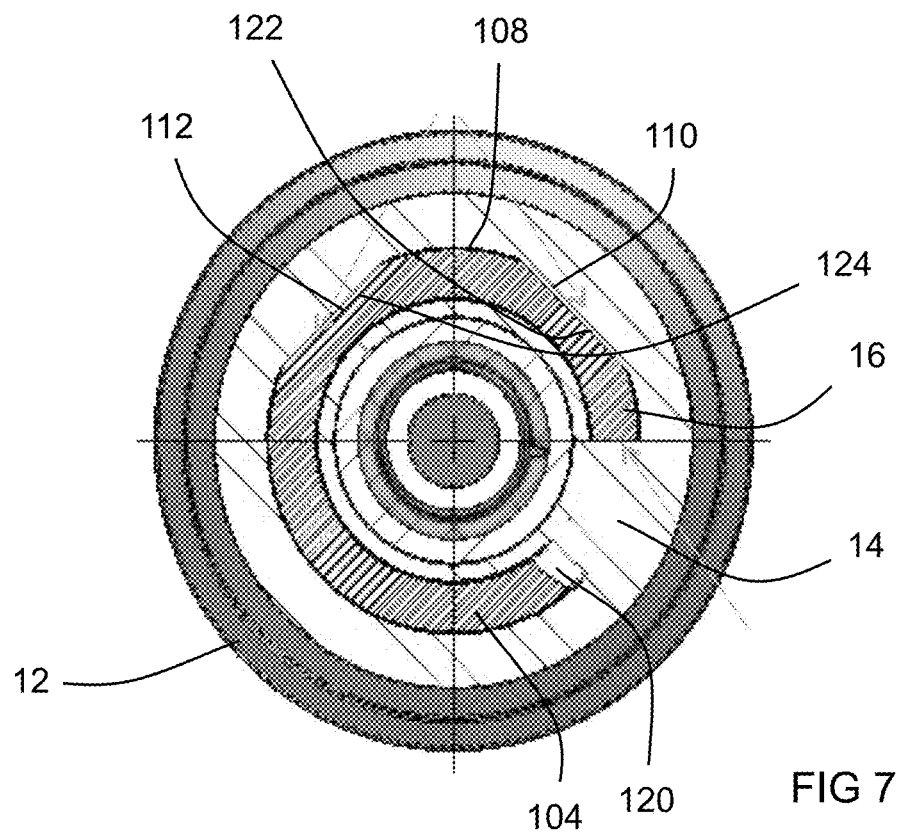

Referring to FIG. 2, the spring 16 has a first helical end 102, a second helical end 104 and a plurality of coils 106 between the first and second ends 102 and 104. The first and second ends 102 and 104 may optionally be rotationally fixed to the pulley 12 and shaft adapter 14 respectively. This may be achieved by any suitable means. For example, the torsion spring 16 has a radially outer surface 108. Each of the first and second ends 102 (FIGS. 6) and 104 (FIG. 7) of the torsion spring 16 has a first flat 110 and a second flat 112 that are substantially perpendicular to one another and which are on the radially outer surface 108. The pulley 12 (FIG. 6) has a groove 114 containing a first flat 116 and a second flat 118 which are sized to mate with the first and second flats 110 and 112 at the first helical end 102 of the torsion spring 16. The shaft adapter 14 (FIG. 7) has a groove 120 containing a first flat 122 and a second flat 124 which are sized to mate with the first and second flats 110 and 112 at the second helical end 104 of the torsion spring 16. It will be noted that the insertion of the first and second ends 102 and 104 into the grooves 114 and 120 to provide engagement of the flats on the pulley 12 and shaft adapter 14 with the flats at the first and second helical ends of the spring 16 takes place substantially without deforming the grooves 114 and 120 and the spring 16. In other words, the spring 16 may fit snugly in the grooves 114 and 120 without resorting to a press-fit that causes the spring 16 and/or the groove to deform during the insertion. Such deformation can weaken the spring and/or the material defining the groove which can cause premature failure of the isolator so configured (as is the case with some isolators of the prior art).

Figure 8:
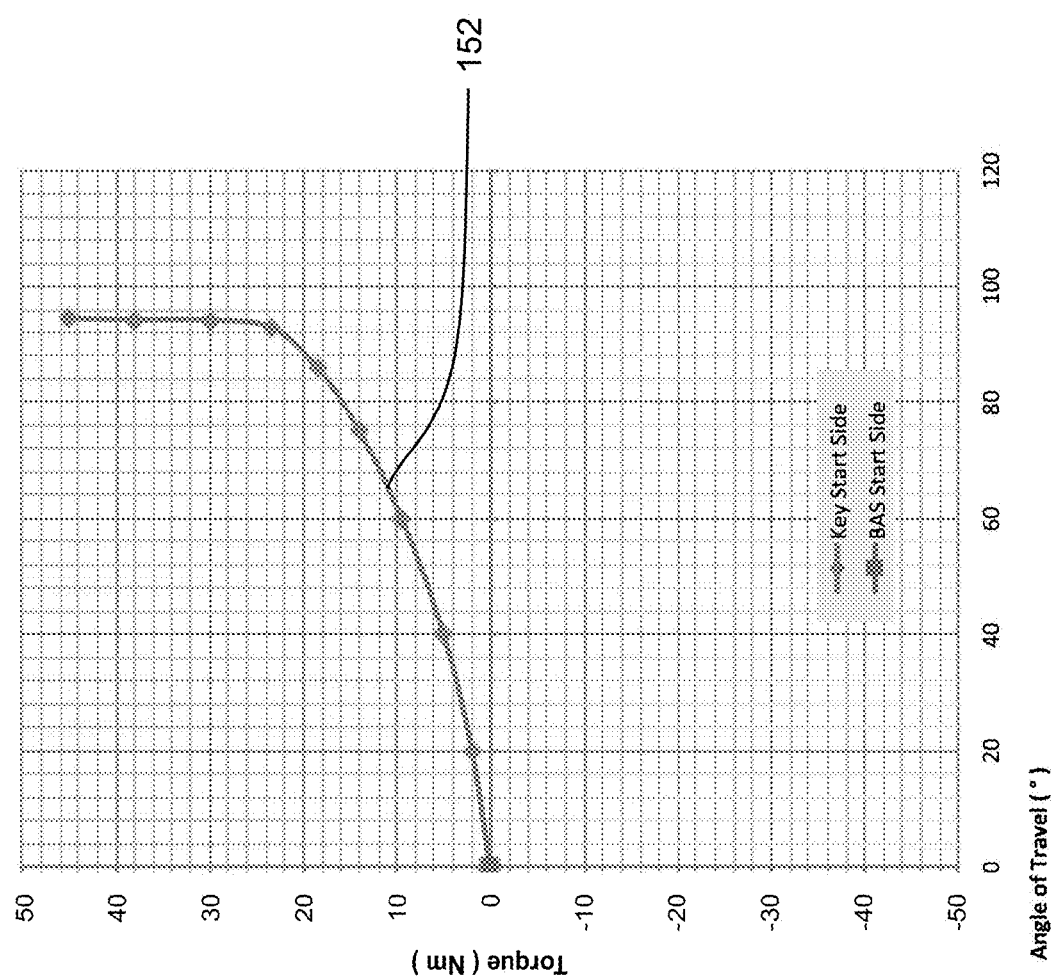
FIG. 8 is a graph illustrating the torque/position relationship for the isolator shown in FIG. 1.

Referring to FIG. 4, it can be seen that the torque limiting surface 22 has a selected spacing G with each of the coils 106. Each individual spacing G may be selected such that, during operation, the torsion spring 16 has a spring rate that is below a first spring rate during relative movement between the shaft adapter 14 and the pulley 12 within a selected angular range from a neutral position, and has a spring rate that increases progressively above the first spring rate during relative movement between the shaft adapter 14 and the pulley 12 beyond the selected angular range from the neutral position. FIG. 8 shows a torque/position relationship curve 152 for the isolator 10. It can be seen in FIG. 8 that, below about 60 degrees, there is less than 10 Nm of torque being transferred through the isolator 10, which makes for a spring rate of less than 0.166 Nm/degree. By having a low spring rate within the first 60 degrees of relative movement, the isolator 10 is better able to isolate the MGU shaft 53a from torsional vibrations that occur in the belt 52 during typical operation of the engine. However, when the torque demand increases it is preferable for the spring rate of the torsion spring 16 to increase so that it can provide the torque necessary without locking up entirely. To facilitate this, the spring 16 is configured so that it has coils 106 (FIG. 4) that have a varying diameters from coil to coil. For example, the coils 106 towards the right side of the spring 106 in FIG. 4 have a larger diameter (and therefore a relatively lower spring rate) than those towards the left side of the spring 106 in FIG. 4. As a result, the rightmost coils in FIG. 4 will expand radially and engage the torque limiting surface 22 before the leftmost coils 106. As each coil 106 progressively expands and engages the torque limiting surface 22 the spring rate of the spring 16 increases. By selecting the gaps G as desired, one can shape the torque/position curve 152 of FIG. 8 as desired, (e.g. so that the spring rate remains low within a selected range of relative movement between the pulley 12 and the adapter 14, and so that the spring rate increases as needed beyond the rate of 0.166 Nm/degree, so that the spring 16 can handle a high load event such as a key start of the engine without fully locking up.

In the embodiment shown in FIG. 4, the gap G at each coil may substantially constant, while the fact that the diameter of the coils 106 progressively changes from coil to coil for at least some of the coils causes a progressive change in the spring rate.

Figure 9:
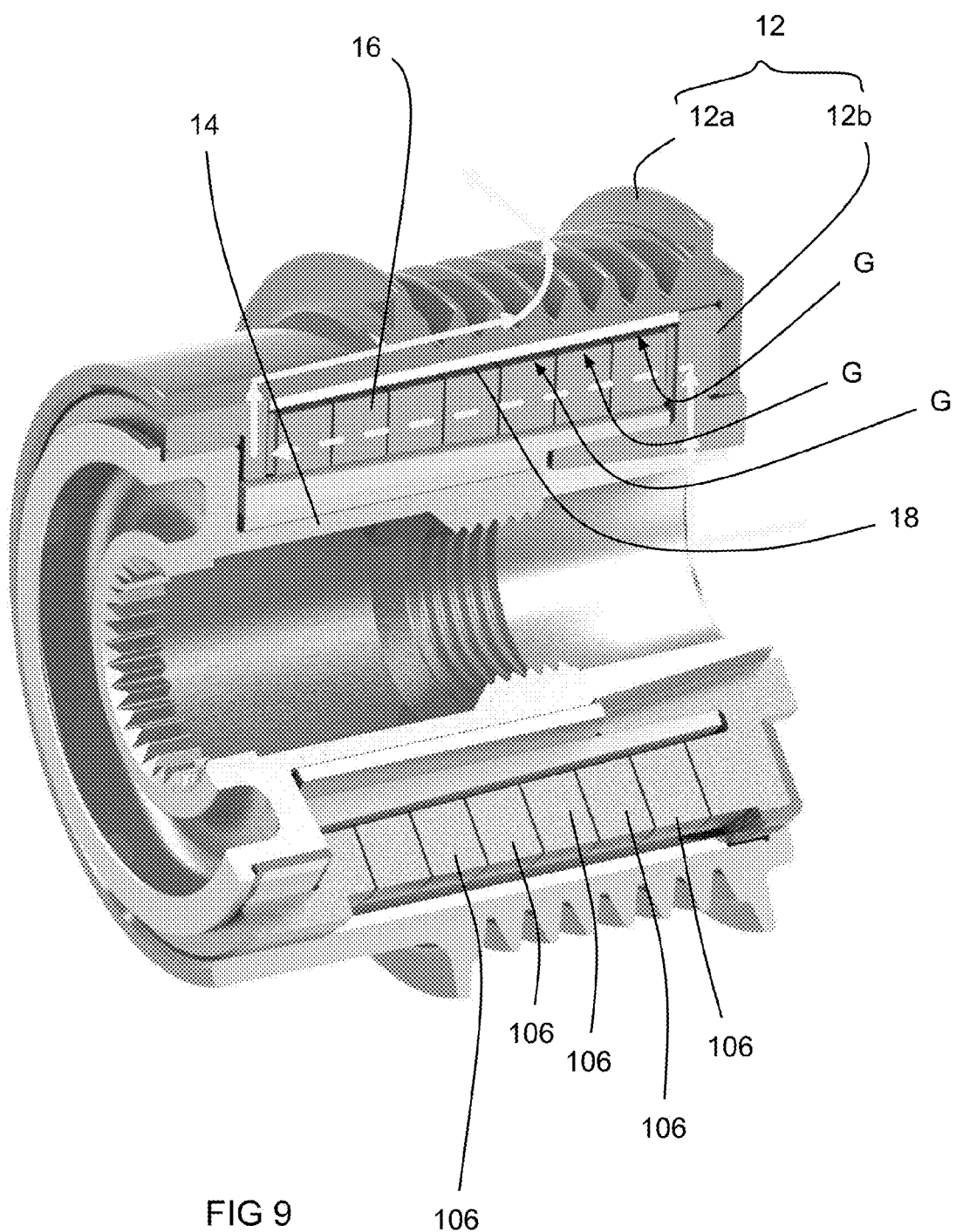
FIG. 9 is a sectional perspective view of an alternative embodiment of an isolator.

Referring to FIG. 9, in an alternative embodiment, the cross-sectional area of the spring 16 changes from coil to coil. As can be seen the rightmost coils 106 of the spring 16 have a greater cross-sectional area (and therefore a higher spring rate) than the coils 106 leftmost coils 106, while the gap G remains substantially constant.

Referring to FIG. 10, an isolator is shown wherein the gap G between the torque limiting surface 22 varies from coil to coil of the spring 16. In this embodiment the coils 106 are substantially the same in terms of spring rate from coil to coil. However, by varying the gap G from coil to coil, the rightmost and leftmost coils 106 will engage the torque limiting surface 22 before the coils towards the middle of the spring 16.

As can be seen in FIG. 2, a spacer 200 is shown positioned between the bearing members 11 to space the bearing members 11 apart by a selected amount, so as to better support the pulley 12 on the shaft adapter 14.

Also as can be seen in FIG. 2, a cover member 202 may be provided to prevent dirt and debris from getting into the isolator 10.

Figure 3:
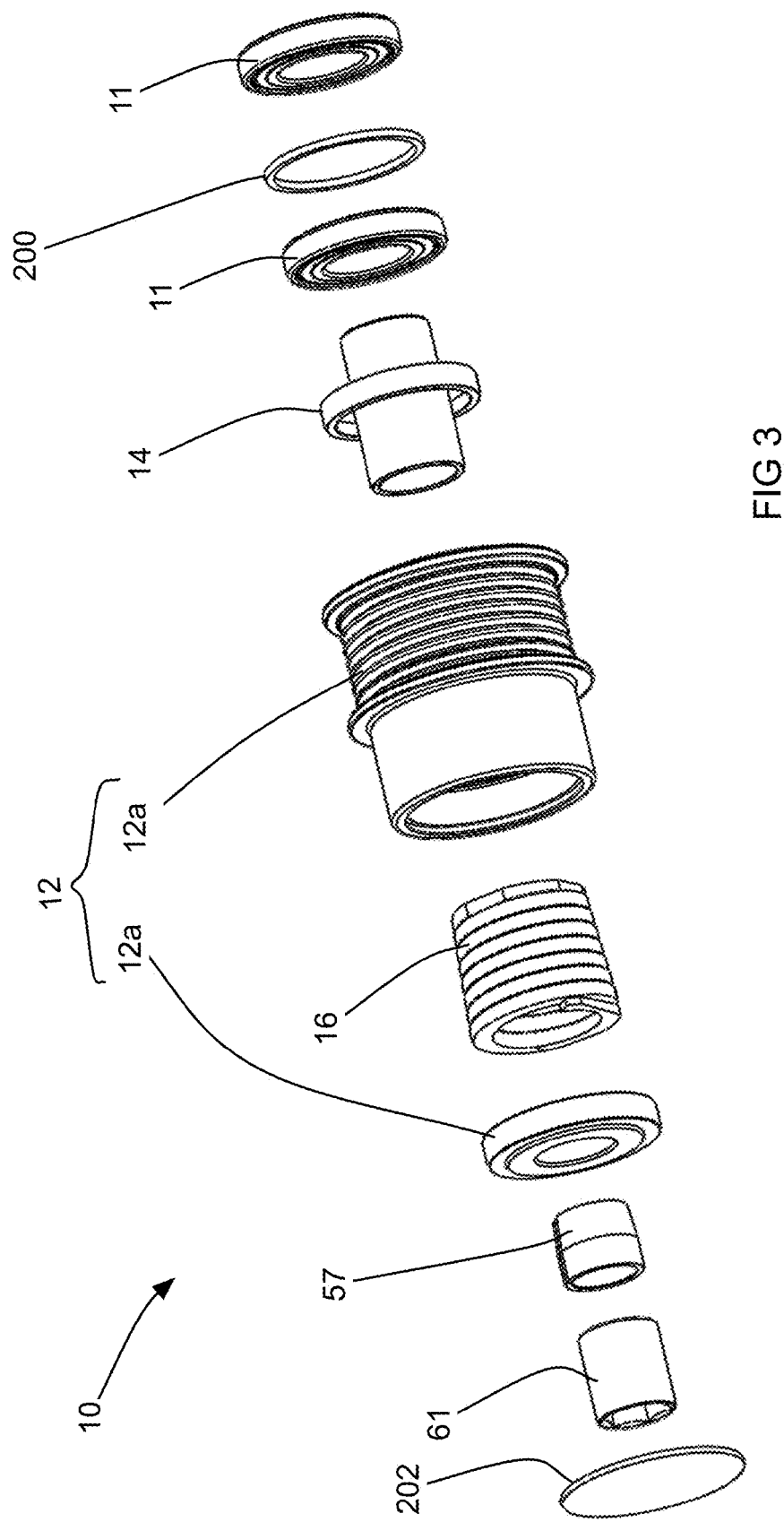
Figure 5:
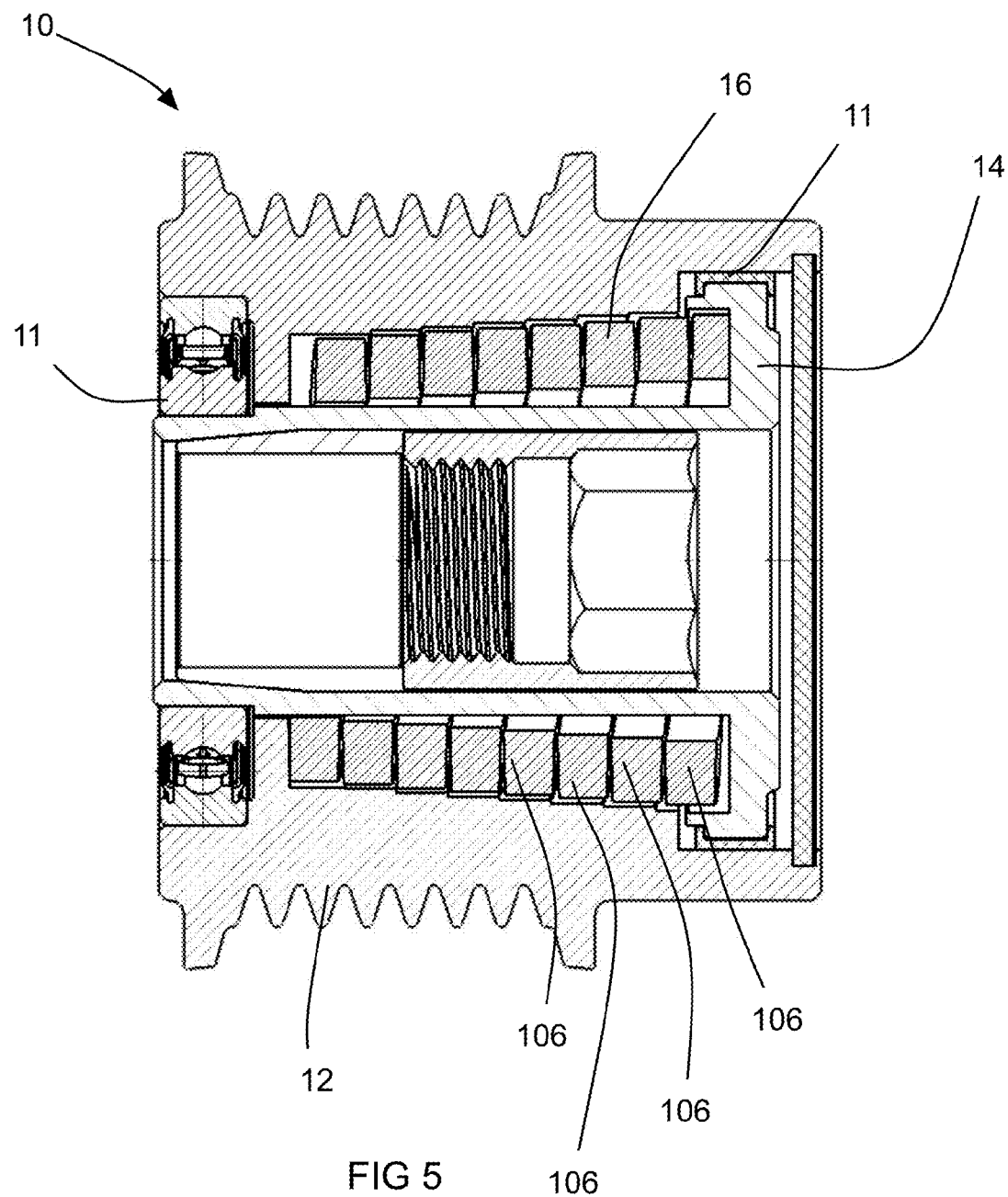
FIG. 5 is a perspective cutaway view of a variant of the isolator shown in FIG. 1.

Reference is made to FIG. 5, which shows a variant of the embodiment shown in FIGS. 2-4. In this variant, the pulley 12 is engaged with the end of the spring 16 having a smaller diameter and the shaft adapter 14 is engaged with the end of the spring 16 having the larger diameter, as opposed to the embodiment in FIG. 4, in which the pulley 12 is engaged with the end of the spring 16 having a larger diameter and the shaft adapter 14 is engaged with the end of the spring 16 having the smaller diameter.

While the isolator 10 is shown as being mounted on the shaft of a driven device on an engine having BAS capability it will be noted that the engine need not have BAS capability. Thus, the MGU 53 may be replaced by an alternator with no alternative means for starting the engine other than its own starter motor (not shown).

While the above description constitutes a plurality of embodiments of the present invention, it will be appreciated that the present invention is susceptible to further modification and change without departing from the fair meaning of the accompanying claims.

What is claimed:

1. An isolator for isolating a device driven by an engine via an endless drive member, comprising:
    a shaft adapter that is connectable with a shaft of the device;
    a rotary drive member that is engageable with the endless drive member;
    a torsion spring that is positioned to transfer torque between the shaft adapter and the rotary drive member, wherein the torsion spring has a first helical end, a second helical end and a plurality of coils between the first and second helical ends; and
    a torque limiting surface that has a selected non-zero spacing from the coils,
    wherein the spacing between the torque limiting surface and each coil is selected such that, during operation, the torsion spring has a spring rate that is below a first spring rate during relative movement between the shaft adapter and the rotary drive member within a selected angular range that is not less than about 60 degrees from a neutral position, and has a spring rate that increases progressively above the first spring rate during relative movement between the shaft adapter and the rotary drive member beyond the selected angular range from the neutral position.

2. An isolator as claimed in claim 1, wherein the torque limiting surface is radially outside of the coils.

3. An isolator as claimed in claim 1, wherein the torque limiting surface is radially inside of the coils.

4. An isolator as claimed in claim 1, wherein the spacing between the torque limiting surface and the coils varies from coil to coil for at least some of the coils.

5. An isolator as claimed in claim 1, wherein the spacing between the torque limiting surface and the coils is constant from coil to coil for at least some of the coils and wherein the cross-sectional area of the torsion spring varies from coil to coil for said at least some of the coils.

6. An isolator as claimed in claim 1, wherein the spacing between the torque limiting surface and the coils is constant from coil to coil for at least some of the coils and wherein the diameter of the torsion spring varies from coil to coil for said at least some of the coils.

7. An isolator as claimed in claim 1, wherein the first and second ends of the torsion spring are fixedly connected to the rotary drive member and the shaft adapter, respectively.

8. An isolator as claimed in claim 7, wherein the torsion spring has a radially outer surface and wherein each of the first and second ends of the torsion spring has a first flat and a second flat that are substantially perpendicular to one another and which are on the radially outer surface,
    and wherein each of the rotary drive member and the shaft adapter has a groove containing a first flat and a second flat which are sized to mate with the first and second flats at an associated one of the first and second helical ends of the torsion spring.

9. An isolator as claimed in claim 1, wherein the spring rate is substantially constant within the selected range from the neutral position.

10. An isolator as claimed in claim 1, wherein the spring rate increases non-linearly beyond the selected range from the neutral position.

11. An isolator as claimed in claim 1, wherein the first spring rate is about 0.166 Nm/degree.

12. An isolator for isolating a device driven by an engine via an endless drive member, comprising:
    a shaft adapter that is connectable with a shaft of the device;
    a rotary drive member that is engageable with the endless drive member; and
    a torsion spring that is positioned to transfer torque between the shaft adapter and the rotary drive member, wherein the torsion spring has a first helical end, a second helical end and a plurality of coils between the first and second helical ends,
    wherein the torsion spring has a radially outer surface and wherein each of the first and second ends of the torsion spring has a first flat and a second flat that are substantially perpendicular to one another and which are on the radially outer surface,
    and wherein each of the rotary drive member and the shaft adapter has a groove containing a first flat and a second flat which are sized to mate with the first and second flats at an associated one of the first and second helical ends of the torsion spring.

* * * * *